March 14, 1933.  L. KIRSCHBRAUN  1,900,940
ROOFING AND METHOD OF MAKING SAME
Filed Aug. 6, 1929  2 Sheets-Sheet 1
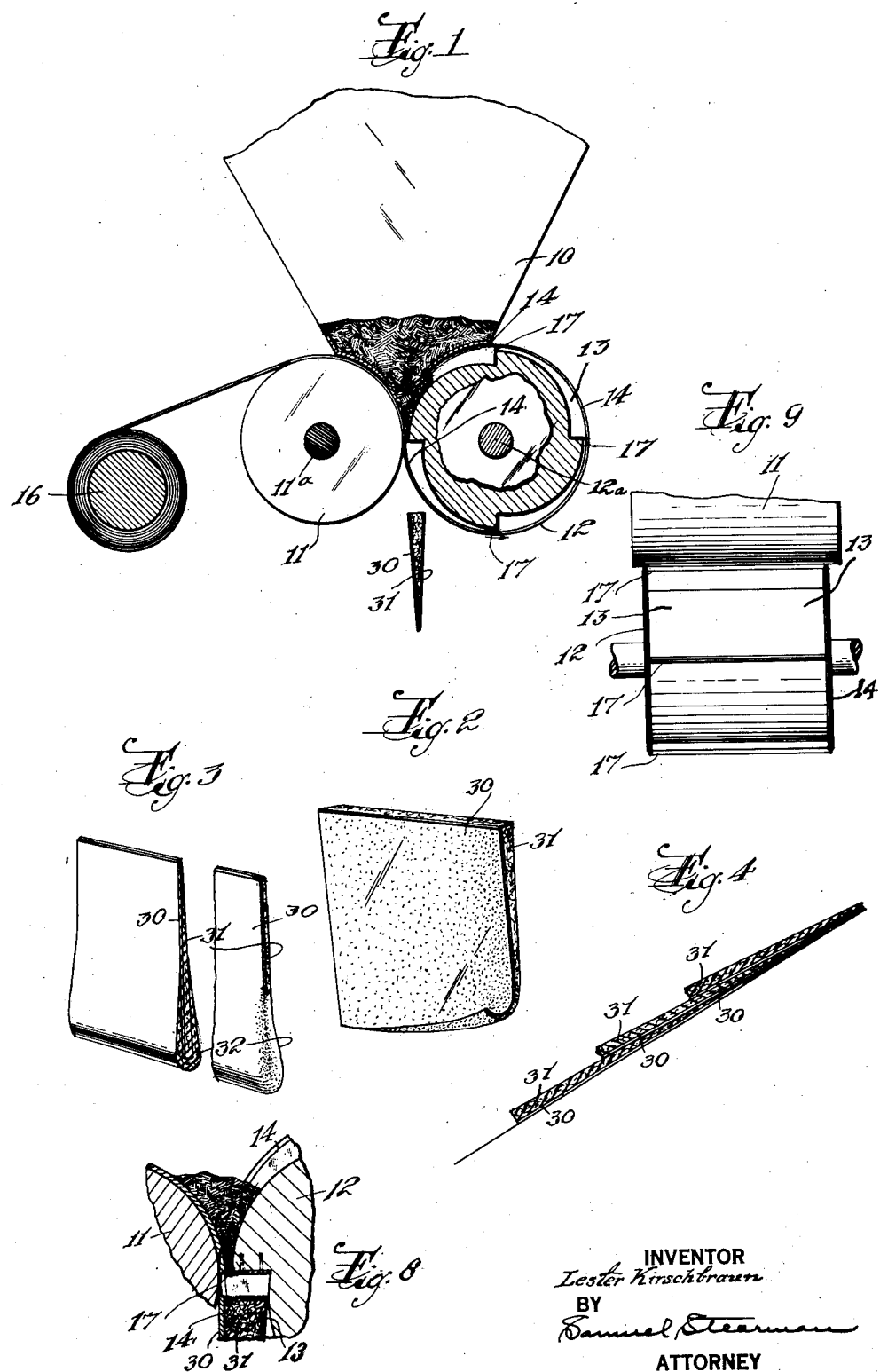
INVENTOR
Lester Kirschbraun
BY
Samuel Stearman
ATTORNEY March 14, 1933.    L. KIRSCHBRAUN    1,900,940
ROOFING AND METHOD OF MAKING SAME
Filed Aug. 6, 1929    2 Sheets-Sheet 2
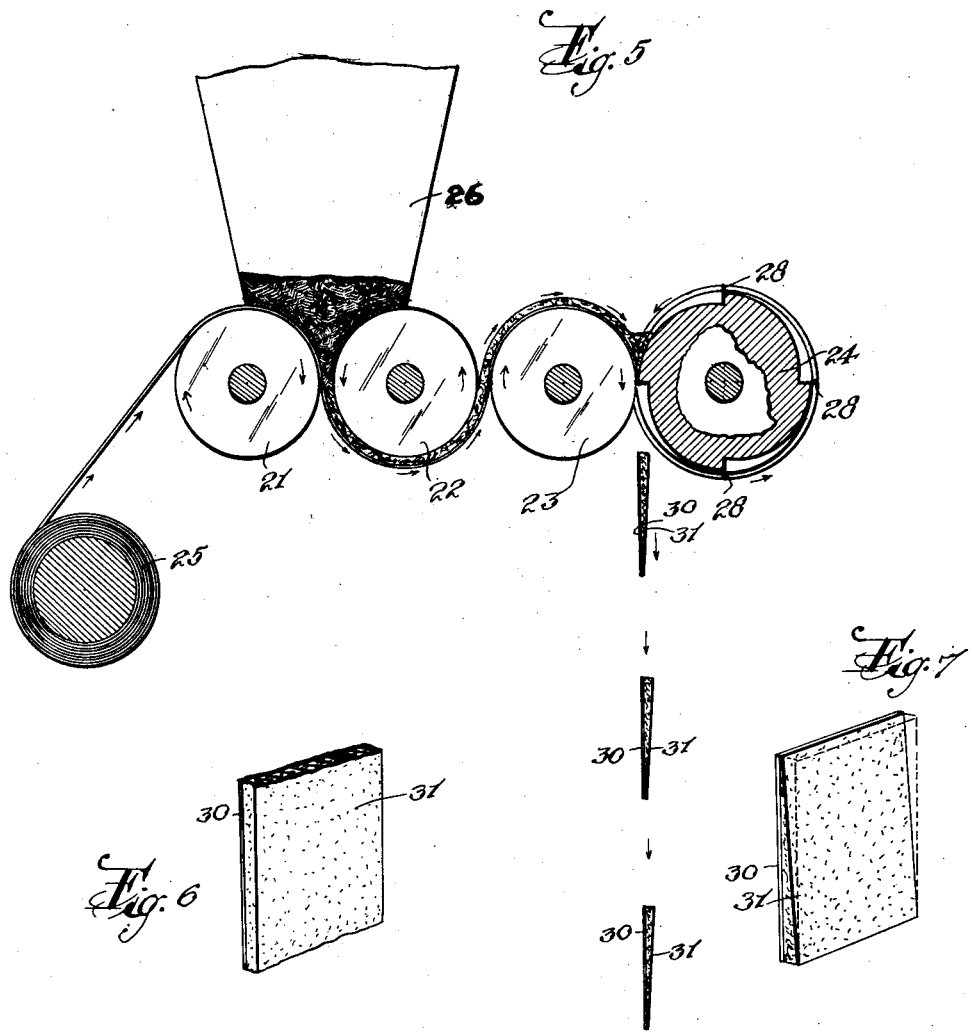
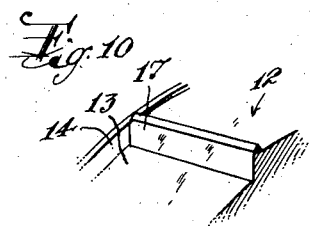
INVENTOR
Lester Kirschbraun
BY
Samuel Stearman
ATTORNEY Patented Mar. 14, 1933

1,900,940

UNITED STATES PATENT OFFICE

LESTER KIRSCHBRAUN, OF LEONIA, NEW JERSEY, ASSIGNOR, BY MESNE ASSIGNMENTS, TO THE PATENT AND LICENSING CORPORATION, OF BOSTON, MASSACHUSETTS, A CORPORATION OF MASSACHUSETTS

ROOFING AND METHOD OF MAKING SAME

Application filed August 6, 1929. Serial No. 383,887.

This invention relates to improvements in the production of composition roofing and is particularly concerned with improvements in the method of producing roofing of this character in which the major part of the roofing body is composed of plastic material that is capable of setting to a more or less hardened condition. Essentially this composition is composed of bituminous material, such as asphalt or like waterproofing substance, combined with hardening fillers, such as fibrous material, finely divided solids, as for example, clay, talc, crushed slate, slate dust, etc., the whole being macerated or kneaded to form a homogeneous plastic mass that can be suitably shaped to desired form under pressure. A convenient source of raw material that may be employed to form such a composition, resides in scrap roofing that accumulates in the manufacture of felted fibrous asphaltic prepared roofing. Since the latter is generally composed of asphalt constituting the waterproofing medium, fibrous material constituting the base and mineral matter constituting the surfacing, scrap roofing of this nature in many instances is admirably suited for the purposes of my invention, but if desired, there may be combined therewith further quantities of asphalt and fillers to vary the composition and consistency of the mixture for the formation of the plastic mass, as required in actual practice.

It has hitherto been proposed to manufacture roofing material from plastic compositions of the character described, but it is found that such a structure, although fairly rigid, is subject to distortion in handling, and does not possess the required strength to resist sloughing and pulling away from the nails when the product is applied on a roof and subjected to the warm summer heat. To overcome this difficulty and in order otherwise to reenforce a structure of this character, it has been proposed to combine with the plastic body jacketing or facing sheets of fibrous material such for example, as waterproof felt.

One of the methods which has been recently suggested for this purpose contemplates completely encasing a plastic core in facing sheets which cover both faces of the body and extend around the edges thereof where they are brought together in edge to edge contact in a plane which bisects the edges of the core. While roofing made in this way possesses certain advantages over a mastic body not reenforced by means of facing sheets, there is danger that the action of the weather upon the product may result in the separation of the facing sheets from the core body, particularly around the portions that are exposed in use. The production of this type of material is also troublesome, owing to the fact that the plastic core body must be formed to shape by means of compression rolls which are recessed on their surface to give the desired form to the finished article, the plastic material for the core being supplied at the nip between the compression rolls and between the fibrous material forming the facing sheets fed over the rolls simultaneously with the feeding of the plastic material therebetween. The cavities or recesses in the forming rolls are also designed to force the marginal edges of the facing material around the edges of the plastic body, and this procedure frequently results in distortion of the facing sheets, particularly where relatively heavy roofing paper is employed as the facing material, owing to the necessity for conforming the paper to the abrupt angles of the recesses or cavities in the forming rolls.

My present invention is directed to the production of a mastic shingle that will be more serviceable in use and not open to the danger of delamination of the fibrous facing sheets around the exposed portions when the product is exposed on a roof, and is further directed to procedure for producing the material in such a way that will eliminate the difficulties of manufacture, as above set forth.

According to the invention, the body portion of the shingle, which consists of the plastic composition, is reenforced by a single facing sheet of fibrous material, this single facing sheet being found sufficient to reenforce the roofing against distortion during handling as well as to prevent sloughing or movement of the plastic body away from the securing nails when the material is subjected to summer temperature conditions in use. In order further to enhance the durability and appearance of the finished product, I preferably also subject the roofing elements after they are formed in the manner stated, to a treatment for covering at least the exposed portions thereof with a coating layer of weather and waterproof material, such as asphalt, and for surfacing the coating layer thus applied with comminuted mineral, such as crushed slate or the like.

The invention will be more fully understood from the more detailed description which is to follow and from the accompanying drawings, in which, Figure 1 is a view partly in elevation and partly in section of apparatus for producing the roofing material in accordance with my invention, Figure 2 is a view in perspective showing a shingle element as produced by the mechanism shown in Figure 1, Figure 3 is a view showing the shingle element as produced by my process and provided with an additional protective layer along the exposed portions thereof, Figure 4 is a view in cross section illustrating the manner in which the shingles are laid upon a roof.

Figure 5 is a view similar to Figure 1, showing a modified arrangement for carrying out the invention.

Figure 6 is a view in perspective of the material as made by the apparatus of Figure 5, prior to completion of the forming operation.

Figure 7 is a similar view illustrating the transformation of the material by means of the apparatus of Figure 5, from the form shown in Figure 6 to a tapered form, Figure 8 is a detail of the apparatus shown in Figures 1 and 5.

Figure 9 is a partial plan view of the forming mechanism shown in Figure 1, and

Figure 10 is a fragmentary perspective of one of the forming rolls.

In carrying out the invention, I first form a homogeneous plastic mass of bituminous material such as asphalt of 140 to 220° F. melting point, and hardening filler, the mixture being worked up and brought to desired consistency in any suitable form of kneading mechanism. As already stated, prepared roofing scrap may be employed for this purpose, combined if desired with further quantities of bituminous material, fibre, and other fillers, such as slate dust, powder talc, mica, saw dust, etc. The plastic material which is to form the main body portion of the roofing is fed from a suitable storage supply 10 in a continuous flow between the opposing surfaces of a pair of cooperating forming rolls 11 and 12, mounted for rotation at equal peripheral speeds, in the direction indicated by arrows, upon horizontally aligned parallel shafts 11a, 12a respectively, and driven from any convenient source of power. As shown in Figure 1, a novel feature of my invention resides in the employment of a roll having a substantially smooth uniform surface, this being the roll 11, and a cooperating roll 12, formed with cavities or recesses 13 which act upon the plastic body to form it while in plastic condition into desired cross-section. As shown, these cavities 13 on the roll 12 are formed to shape the plastic material into a tapering cross-section, and this forming roll is likewise provided with circular trimming edges 14 upon the periphery of its end faces, in order to trim the plastic body along the side margins thereof.

It will be noted also that the cavities in the roll 12 are arranged with the variation in their depth extending in the same direction with respect to the direction of movement of the rolls, preferably with the shallow portion of each cavity in advance of the deeper portion thereof so that the elements formed by the roll will all be formed with their thinner ends in leading position. The fibrous material forming the facing sheet which I use upon one side of the body portion, may be delivered from a supply roll 16, and it may consist either of asphalt impregnated felt or asphalt impregnated, and coated roofing material. The fibrous facing material is fed over the smooth roll 11, so as to be brought in contact with the plastic material as the latter is being fed between the cooperating rolls. It will thus be seen that only the plastic body material is forced into and conformed by the recesses 13, while the fibrous facing material is maintained in perfect facial contact with the smooth roll 11 at all times and particularly during the stage when the plastic body is formed to shape by the recessed roll and united with the facing material. Hence distortion or stretching of the facing sheet and the consequent tendency of the shingle to take other shape when the paper facing resumes its original condition, are eliminated.

In order to separate successive elements after formation of the plastic body to desired shape by the recessed roll 12, I provide knives 17 upon the latter roll extending lengthwise thereof and projecting outwardly, to the same radial extent as the circular trimming edges 14, as clearly shown in Figures 1 and 10. These knives 17 are positioned on the roll 12 at the juncture between the deeper end of each cavity 13 and the shallower end of the succeeding cavity, as clearly shown in Figure 8, the separated elements being discharged from between the forming rolls in the manner indicated in Figure 1.

In Figure 5 there is illustrated a modified arrangement for forming the plastic body material in association with the fibrous facing sheet to desired tapered form. According to this arrangement the plastic material is first brought into association with the fibrous facing material and formed thereon in a layer of uniform thickness, after which the plastic material is acted upon so as to transform the same from uniform thickness to a plurality of successive portions each tapering in cross-sectional thickness, the thus shaped plastic material and its associated supporting sheet being then or subsequently severed into separate elements. As here illustrated a series of rotatable rolls 21 to 24 is provided, these rolls being preferably in horizontal alignment, and mounted for rotation at equal peripheral speeds. The rolls 21, 22 and 23 are each smooth on their peripheral surface, and they are mounted at suitably spaced intervals to provide a clearance between their opposing surfaces corresponding to somewhat less than the maximum thickness of the elements to be produced. The roll 24 of the series is constructed precisely in the same manner as is roll 12 of Figure 1, and cooperates with the roll 23 substantially in the same way as do the rolls 11 and 12 of Figure 1. The fibrous facing material, according to this arrangement, delivered from a supply roll 25, is led over the upper portion of the rotating roll 21 and then looped around the succeeding rolls 22 and 23, while the plastic material forming the main body portion of the product is delivered from a storage supply 26 onto the upper face of the facing sheet passing around the roll 21 and between the sheet and the cooperating surface of the roll 22. Under the action of the pressure between the cooperating rolls 21 and 22 the plastic material will thus be affixed to the fibrous sheet and conformed to substantially uniform thickness corresponding to the space between the opposing surfaces, whereupon the fibrous facing sheet with its associated layer of plastic material, will pass around the lower surface of the roll 22 and over the upper face of the roll 23, being additionally compressed and compacted, if desired, between the opposing surfaces of the rolls 22 and 23. As the plastic body thus united to the fibrous sheet and compressed to desired uniform thickness, comes into the nip between the roll 23 and the recesses in the roll 24, the plastic material will be forced progressively rearwardly from the shallower into the deeper portions of the recesses in the roll 24, and thus be altered from uniform cross-sectional thickness to successive portions of tapering cross-sectional thickness. This alteration in the cross-section of the plastic layer by the action which takes place between the cooperating rolls 23 and 24, is illustrated in Figures 6 and 7. The knives 28 then come into play to sever successive elements transversely of the sheet at the line of juncture between the thickest portion formed by each of the recesses in the roll 24 and the thinnest portion formed by the succeeding recess in this roll.

If desired, the transverse knives 17 of Figure 1, and 28 of Figure 5, may be constructed to avoid cutting entirely through the facing sheet, but to merely weaken the same to enable complete severance to be made subsequently. For this purpose, these knives may be foreshortened, i. e., with the edges thereof spaced inwardly of the end knives 14. Alternatively, the knives 17 and 28 may be formed with a discontinuous edge so as to leave short connecting portions between the successive elements, as formed. In any event, this feature will provide a continuous sheet of the successive elements for subsequent treatment, such as will be hereinafter described, after which the sheet can be readily separated into its component units.

In Figure 2 I have shown the appearance of the roofing elements formed by either of the methods above described, the numeral 30 indicating the supporting or facing sheet, and numeral 31 indicating the main body portion of the plastic material, gradually increasing in thickness toward the butt edge of the element. While the article as thus formed may be suitable for many purposes, I prefer to coat the lower or butt portions thereof, as indicated in Figure 3, with a layer 32 of weather and waterproofing material, such as molten asphalt, and this may be accomplished in any convenient way as by immersing the elements in a bath of the coating material or conducting them beneath a spray or shower of the coating material, whereupon the coated portions are covered or contacted with comminuted mineral surfacing material. The elements may thereafter be passed under suitable press rolls to affix and partially imbed the comminuted material in the coating layer and provide a finished surfacing for the product. Generally, by thus treating the elements, the coating layer may be made to extend around the butt and side edges thereof, thereby further protecting the finished product against the deteriorating influences of the weather.

The roofing elements as thus produced in addition to possessing the advantages already set forth, possess the desirable characteristic of plastic or mastic shingles as heretofore made, namely, that the butt or exposed portions thereof may be made considerably thicker than is possible in commercial practice with the usual form of felt base prepared roofing, and by producing them in tapered form as described, provide an admirable and inexpensive substitute for shingles of wood, slate and the like.

Figure 4 illustrates a section of several of the elements as they appear when laid up in courses on a roof, wherein it will be noted that they are laid with the side which carries the fibrous facing sheet lowermost.

In this way, and particularly were an additional layer of coating and surfacing material is supplied upon the exposed portion, the tendency for the facing or reenforcing sheet to separate from the mastic body is entirely eliminated. While I have referred to the product of my present invention as roofing material, it should be understood that it may be used for numerous other purposes such for example, as siding, and where the words "roofing material" appears in the claims, it is intended thereby to include siding and similar building products.

If desired, the shingle elements may be laid with the fibrous facing sheet uppermost, in which case the facing material will preferably consist of precoated waterproof felt surfaced with mineral grit, so that the unit requires substantially no further finishing treatment. In such case also, the facing sheet will preferably be narrower than the plastic core body to provide lateral margins of the hardened plastic core material extending upwardly and terminating in the plane of the facing sheet.

It will be evident also that while I have illustrated individual shingle elements in the several figures of the drawings, so-called shingle strips carrying a number of tabs or shingles-similating portions of various shapes and sizes may similarly be produced in the practice of my invention by suitable enlargement and corresponding modification of the forming mechanism.

Having described in rather full detail the nature of my invention, it should be apparent that these details need not be strictly adhered to but that various changes and modifications may readily suggest themselves to those skilled in the art, without departing from the principles of the invention, as defined by the appended claims.

I claim as my invention:

1. The method of forming tapered roofing elements having the main body portion thereof composed of hardened plastic material which consists in feeding lengths of fibrous sheets over a smooth surface, simultaneously discharging homogeneous plastic material composed of bitumen and hardening fillers onto one face of said fibrous sheet and forcing said plastic material into a cavity of variable depth acting in opposition to said smooth surface.

2. The method of forming tapered roofing elements having the main body portion thereof composed of hardened plastic material, which consists in feeding lengths of fibrous sheets over a smooth surface, simultaneously discharging homogeneous plastic material composed of bitumen and hardening fillers onto one face of said fibrous sheet and forcing said plastic material into a cavity of variable depth acting in opposition to said smooth surface, while maintaining said fibrous sheet in contact with said smooth surface.

3. The method of forming tapered roofing elements having the main body portion thereof composed of hardened plastic material which consists in feeding lengths of fibrous sheets over a smooth surface, simultaneously discharging homogeneous material in a plastic state, composed of bitumen and hardening fillers, onto one face of said fibrous sheet, forcing said plastic material into a cavity of variable depth acting in opposition to said smooth surface, and severing separate elements from the thus formed plastic mass and its united fibrous sheet.

4. The method of forming tapered roofing elements having the main body portion thereof composed of hardened plastic material which consists in feeding lengths of fibrous sheets over a smooth surface, simultaneously discharging homogeneous plastic material composed of bitumen and hardening fillers onto one face of said fibrous sheet, and subjecting the plastic material on said sheet to pressure between said smooth surface and a cooperating cavity of a depth varying in the direction of feed of the fibrous sheets, whereby to compact the plastic material onto said sheet and form a plastic body of tapered cross-section united to the sheet.

5. The method of forming tapered roofing elements having the main body portion thereof composed of hardened plastic material which consists in feeding lengths of fibrous sheets over a smooth surface, simultaneously discharging homogeneous plastic material composed substantially of scrap prepared roofing onto one face of said fibrous sheet, subjecting the plastic material on said sheet to pressure between said smooth surface and a cooperating cavity of variable depth, whereby to compact the plastic material onto said sheet and form a plastic body of tapered cross-section united to the sheet, severing separate elements from the plastic body thus formed and united to said sheet, and coating the weather exposed edges of the elements with waterproofing material.

6. The method of forming tapered roofing elements having the main body portion thereof composed of hardened plastic material, which comprises feeding lengths of fibrous sheets over a smooth surface, discharging homogeneous material in a plastic state, composed of bitumen and hardening fillers, onto one face of said fibrous sheet, subjecting the plastic material to pressure whereby to form the same into a layer of uniform thickness on said sheet and thereafter subjecting said layer to pressure within a cavity of gradually increasing depth.

7. The method of forming tapered roofing elements having the main body portion thereof composed of hardened plastic material, which comprises feeding lengths of fibrous sheets over a smooth surface, discharging homogeneous material in a plastic state, composed of bitumen and hardening fillers, onto one face of said fibrous sheet, subjecting the plastic material to pressure whereby to form the same into a layer of uniform thickness on said sheet and thereafter subjecting said layer to pressure within a cavity of gradually increasing depth, whereby to transform said layer into successive areas of tapering thickness and severing separate elements at the boundaries between said successive areas.

8. A continuous method of forming roofing elements which consists in continuously feeding a sheet of fibrous material over a smooth surface, continuously feeding homogeneous material in a plastic state, composed of bitumen and hardening fillers, onto the exposed surface of said sheet and compressing said plastic material while said sheet is in contact with said smooth surface to form a plurality of elements tapering in the direction of travel of said sheet.

Signed at Rutherford, in the county of Bergen and State of New Jersey, this 29th day of July, A. D. 1929.

LESTER KIRSCHBRAUN.